July 6, 1965 B. P. LE BOEUF 3,192,626
AUTOMATIC MOULDING DEVICE FOR CHEESES
Filed Nov. 14, 1962 5 Sheets-Sheet 1

INVENTOR
BERNARD PAUL LE BOEUF
By Irwin & Thompson
ATTY.

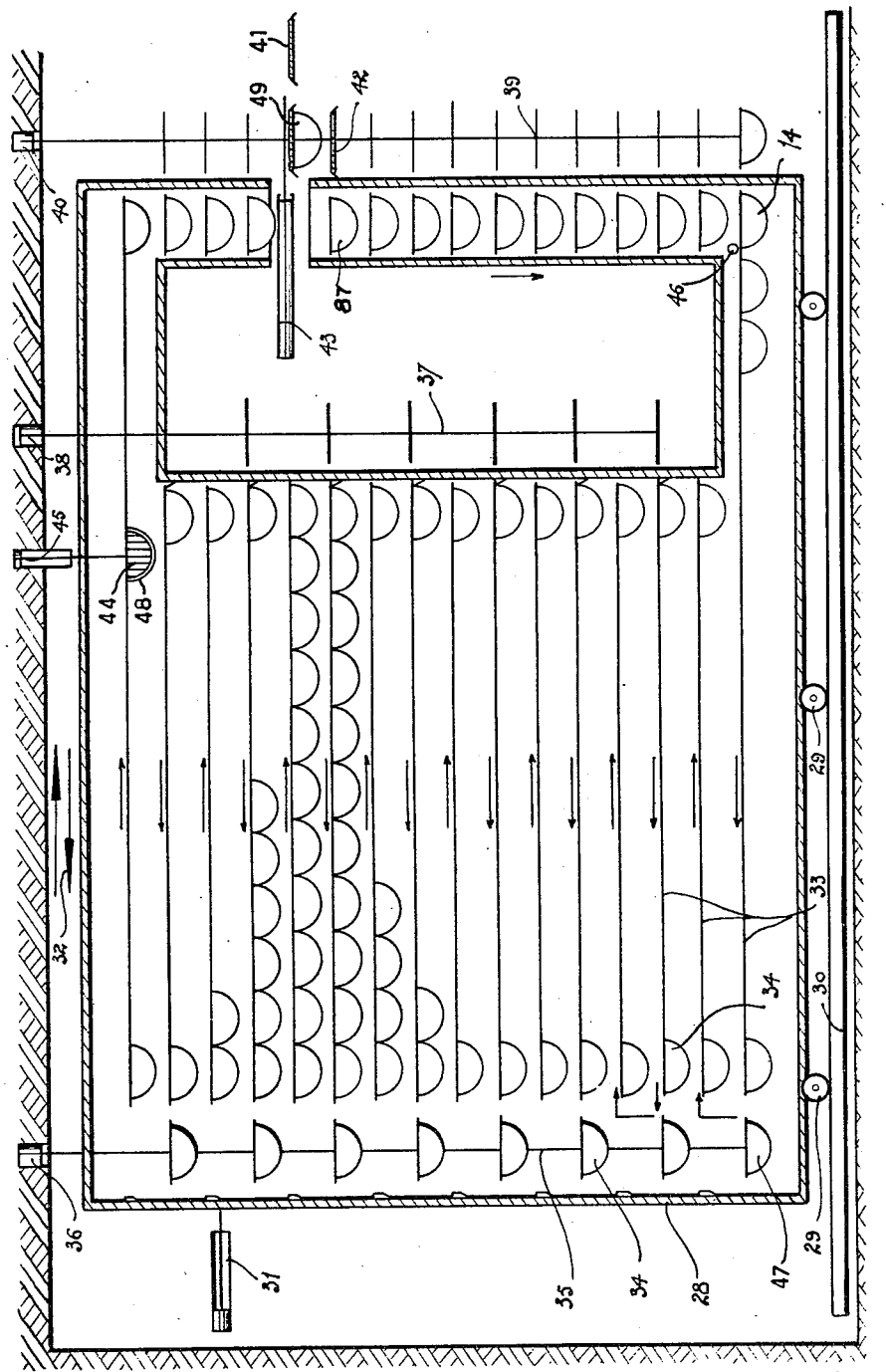

July 6, 1965    B. P. LE BOEUF    3,192,626
AUTOMATIC MOULDING DEVICE FOR CHEESES
Filed Nov. 14, 1962    5 Sheets-Sheet 3
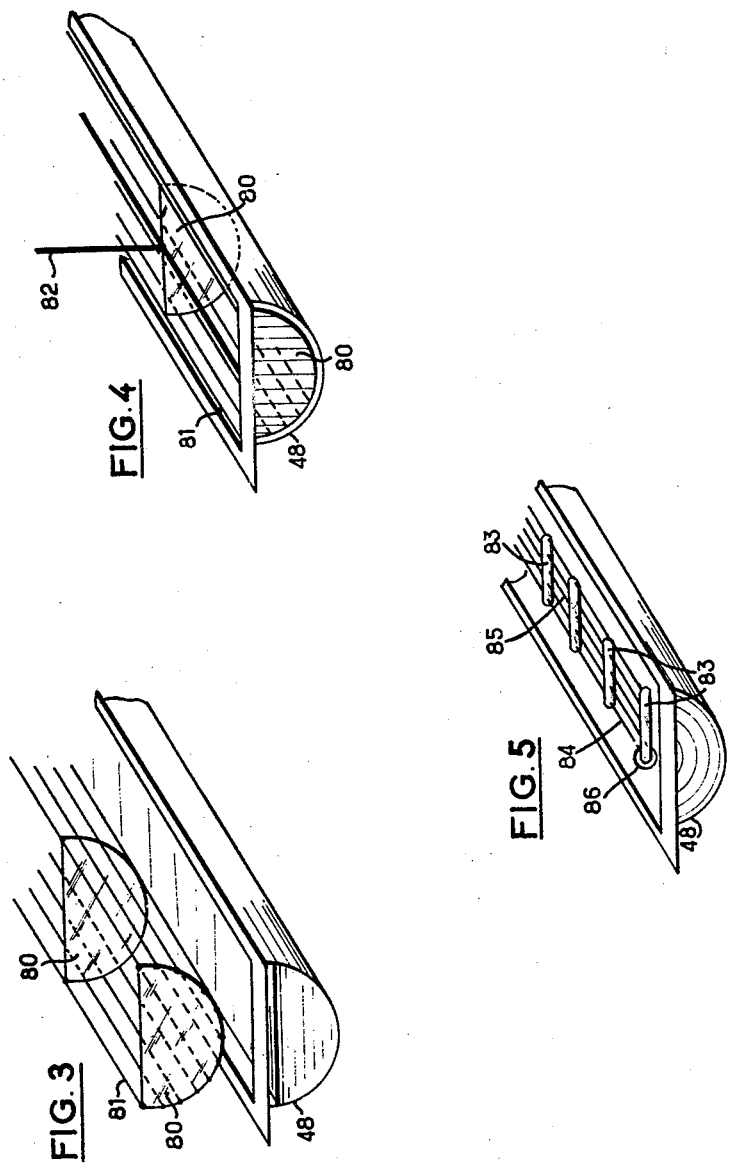
INVENTOR
BERNARD PAUL LEBOEUF
By Irwin N. Thompson
ATTY.

July 6, 1965   B. P. LE BOEUF   3,192,626
AUTOMATIC MOULDING DEVICE FOR CHEESES
Filed Nov. 14, 1962   5 Sheets-Sheet 4

INVENTOR
BERNARD PAUL LE BOEUF
By Irwin N. Thompson
ATTY.

United States Patent Office 3,192,626
Patented July 6, 1965

3,192,626
AUTOMATIC MOULDING DEVICE FOR CHEESES
Bernard Paul Le Boeuf, Avranches, France, assignor of one-half to Ateliers et Chantiers de Nantes, Bretagne-Loire, Nantes, France, a corporation of France
Filed Nov. 14, 1962, Ser. No. 237,599
3 Claims. (Cl. 31—49)

The present invention relates to the manufacture of cheese and is directed to an apparatus which enables hand moulding to be replaced by a mechanical moulding which a continuous cycle.

This device comprises in succession a milk-coagulation station with advancing troughs which receive the milk with rennet and ferments added, comprising means for cutting the coagulated mass, a moulding station for the curd by emptying the troughs into moulds, and a draining station for the moulds, the three stations co-operating in a continuous cycle.

With the device, instead of effecting the coagulation in a special vat from which the curds are taken to fill the troughs, the coagulation is carried out in the troughs themselves, and these troughs are moved following a continuous cycle up to the device by which they are transferred into the draining moulds.

In the coagulation stage there is provided a cutting operation, in which the mass of curdled milk is cut-up into small portions which permit the serum to close to come into internal contact with the cut-up portions. This cutting operation can be effected by longitudinal or transverse cutting or longitudinal and transverse cutting simultaneously, or alternatively circular cutting.

The coagulation station is arranged so as to ensure a duration of travel of the troughs which is sufficient to effect the complete transformation of the milk to curds. This movement is obtained by displacement of the troughs on successive horizontal or vertical tracks, with transfer means from one track to the following track. Or alternatively it is effected by means of a continuous chain conveyor.

The moulding station may be of any type intended to ensure continuous operation. In particular, moulding is advantageously effected by the displacement and the emptying of the troughs into the draining moulds in a device of the endless-chain type.

The draining station may be constituted by conveyor belts in the usual manner, one carrying away the filled and treated draining moulds and the other bringing back the empty draining moulds to the moulding station. However, instead of single horizontal belts, the draining may be carried out in a multiple-track device in which the draining moulds circulate in a similar manner to the troughs in the coagulation station.

This device not only eliminates the necessity of the manual work of handling in the successive transformations of the milk, but it offers the further advantage of ensuring great regularity and uniformity of the operations, favourable to conditions of hygiene and constant quality of the cheese. It also ensures a greater productivity of the dairies.

The accompanying drawings represent by way of non-limitative examples, the forms of embodiment of the device according to the invention.

FIG. 2 shows a more detailed view of the coagulation station in vertical longitudinal section.

FIGS. 3 and 4 show a perspective view of the detail of a curd-cutting device.

FIG. 5 shows a further curd-cutting device.

Figure 1:
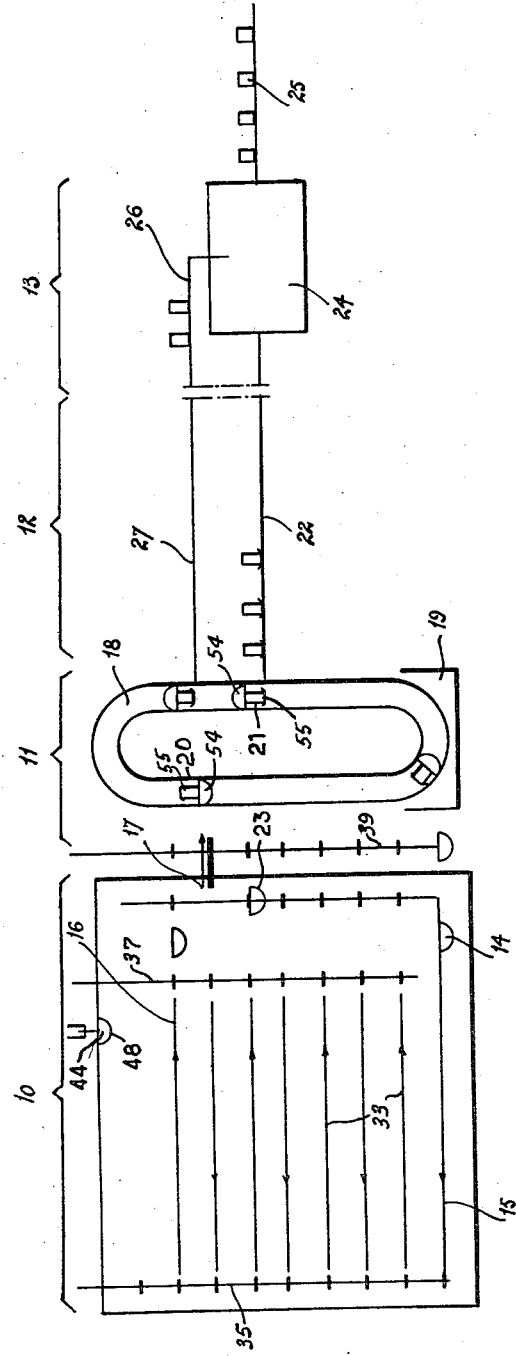
FIG. 1 is a general diagram of the installation.

Shown in a diagrammatic manner, the installation comprises a coagulation station 10, a moulding station 11 operating by overturning of the carrying troughs, and a draining station 12.

Following this latter, there is provided a demoulding station 13 for the cheeses with return of the empty draining moulds to the moulding station 11.

The coagulation is carried out in troughs 34 which are a kind of elongated tanks of semi-circular section, travelling inside the station 10, the duration of travel being calculated so as to ensure the complete conversion of the milk, to which is added rennet and ferment.

The empty troughs 34 are brought in at 14 (FIG. 1) at the lower part of the coagulation station 10 in front of a distributor (46 in FIG. 2) which is supplied with milk with rennet added, supplied by a distributor pump (not shown). After having received its charge of milk, the trough 34 is pushed onto the lower rail of the system of tracks or rails 33 and travels along the path indicated by the arrows, by means of the lifts 35, 37, from the lower rail at 15 up to the upper rail at 16. On the upper rail, the troughs are subjected to the action of a cutting device 44 before being led through the discharge 17 to the moulding station 11.

The movements of the lifts 35 and 37 by means of the jacks 36 and 38 are effected conjointly with the to-and-fro movements of the trolley 28.

Figure 6:
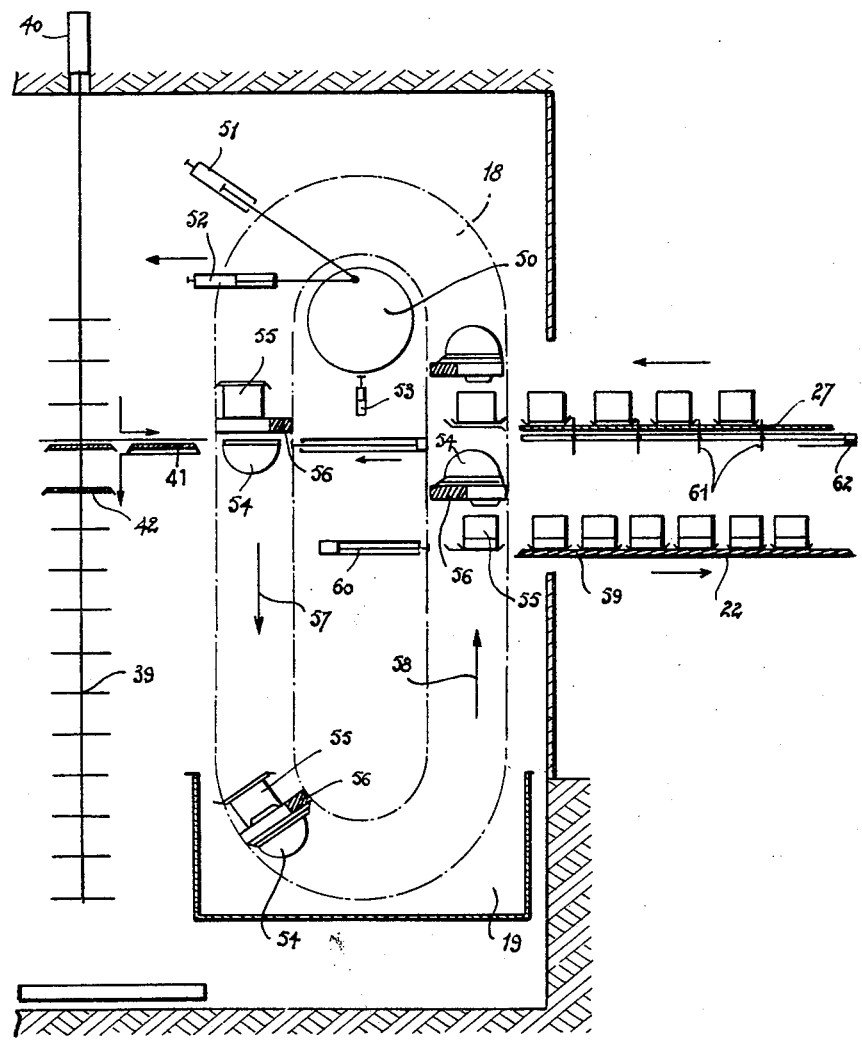
FIG. 6 shows the moulding station with a portion of the draining station in vertical section.

The station 11 comprises an endless chain 18 (FIGS. 1 and 6), the lower part of which dips into a tank 19 containing serum. The trough containing the curdled milk coming from the coagulation station at 49 (FIG. 2) is led by a conveyor 41 into the endless chain 18 at the position 20 (FIG. 1) or 54 (FIG. 6).

This trough 54 then receives an empty draining mould 55. This mould 55 is made up of a number of bottomless containers of cylindrical, prismatic or other section, depending on the final shape which the cheese is required to have. The assembly comprised by the trough 54 and the mould 55 is driven by the endless chain 18 until it arrives at the position 21 (FIG. 1), after having been immersed in the tank 19. During this movement, the curdled milk is passed from the trough 54 into the mould 55, and the moulds 55 reaching 21 are full and are pushed by the jack 60 into the draining station 12. The drainer mould is detached from the assembly and is transferred to a conveyor 22 arranged so as to permit the desired amount of draining. The separated trough is withdrawn from the chain 18, cleaned if necessary and is brought back at 23 to the coagulation station, where it re-enters the cycle.

The drainer-moulds carried by the conveyor 22 then pass into the station 13, in which they are turned over and the cheeses are de-moulded at 24, and are then carried by a conveyor 25 towards the storage and ripening section. The empty drainer-moulds are taken at 26 and sent back by 27 to the station 11, after washing if necessary.

In the form of construction shown in FIG. 2, the coagulation station comprises a pusher frame or supporting casing 28 mounted on rollers 29 travelling on rails 30. This casing may therefore be given a longitudinal movement of translation by the action, for example, of a jack 31. This movement is indicated by the arrows 32.

This casing co-operates with an assembly of rails 33 forming superposed tracks. Each of these rails 33 forms a sliding track for the side extremities 80 of the troughs 34. At 35 is arranged a lift actuated by a jack 36, receiving the troughs 34 and the uprights of a rail 33 on the rail immediately above.

A further lift device of the same kind is provided at 37 and actuated by a jack 38, and finally a third lift device is provided at 39, actuated by the jack 40.

At 41 and 42 are arranged slides which provide for the outward passage of the full troughs or for the admission of the empty troughs. The movement of the troughs is effected by a jack 43. At 44 is located a curd-breaking means or cutting device with its operating system 45.

The combination of vertically reciprocable lift means, adapted to receive supports thereon, the supports being slid onto and off of the lift means by horizontally reciprocable pusher means, is of course old as such, as in U.S. Patent No. 2,459,524.

In this coagulation unit, the empty troughs are brought in at 87 and moved down by the lift device 39. At the position 14, the trough receives from a pipe 46 arranged as a distributor of stainless steel, supplied by a dosing pump, a pre-determined quantity of milk to which has been added rennet and ferments. Then the trough is progressively pushed onward by the troughs successively introduced, until it reaches the extremity of the rail 33 on the lift device 35. At that moment, the trough 47 is mounted on the track 33, along which it moves from left to right. It is then lifted to the stage above and so on.

On the last rail, that of the upper portion, the trough in the position 48 is subjected to a cutting operation by the device 44. This cutting may be carried out by the device illustrated in FIGS. 3 to 5.

IN FIGS. 3 and 4, the cutting device moves laterally. It is made-up of vertical elements 80, spaced apart in the form of semi-circular plates, the dimensions of which correspond to the insides of the trough 48, and connected together by horizontal wires 81.

The whole assembly is fixed to an operating means, such as a rod 82 coupled to the operating jack 45 (FIG. 2).

When the trough 48 comes under the device 80-82, the latter is actuated by the jack and passes down into the trough (FIG. 4), the plates 80 and the wires 81 making vertical cuts in the mass of curds, thus dividing up this mass and rendering it permeable to the serum resulting from the coagulation contained in the trough 48.

In FIG. 5, the cutting device is of the rotary type. It is constituted by blades 83 fixed on a shaft 84. Between the blades 83 are stretched wires 85. The blades and the wires are of stainless steel. A means for driving the shaft 84 in rotation is indicated diagrammatically at 86. When the trough 48 comes in front of this device, the latter is set into rotation and this rotation forms radial and circular passages in the mass of curds, facilitating contact of the serum with the interior of this mass.

These longitudinal, vertical or circular cutting means may, of course, be utilized separately or simultaneously, depending on the degree of cutting required.

After the cutting operation, the full troughs are brought to 49 and finally pass out of the apparatus over the fixed slide 41, which leads them to the moulding station.

As shown in FIG. 6, this station comprises an endless chain 18 driven by a detent wheel 50. This wheel 50 is driven by jacks 51 and 52, with a device 53 for maintaining it in position. The chain 18 receives at 54 the full trough brought in by the slide 41. To this trough is fixed a drainer mould 55. The coupling of the troughs to the drainers is obtained by any convenient means, in particular by means of distributors 56. The assembly 54-55-56 is driven by the chain 18 which moves in the direction of the arrows 57-58. As this assembly passes to the lower portion, it turns over as shown. The curds which were contained in the trough pass into the drainer moulds and the serum flows into the tank 19.

When the assembly 54-55-56 comes level with the slide 59, the drainer mould 55 is detached from the trough 54 and from the distributor 56. The mould 55, filled with cheese, is pushed by the jack 60 on the conveyor plate or belt 22.

The empty drainer-moulds are brought on to the chain 18 by a slide or conveyor 27 so as to be able to carry out a further operation. In particular, it is possible to use a slide 27 with a driving frame having dogs 61 actuated by a jack 62.

Figure 7:
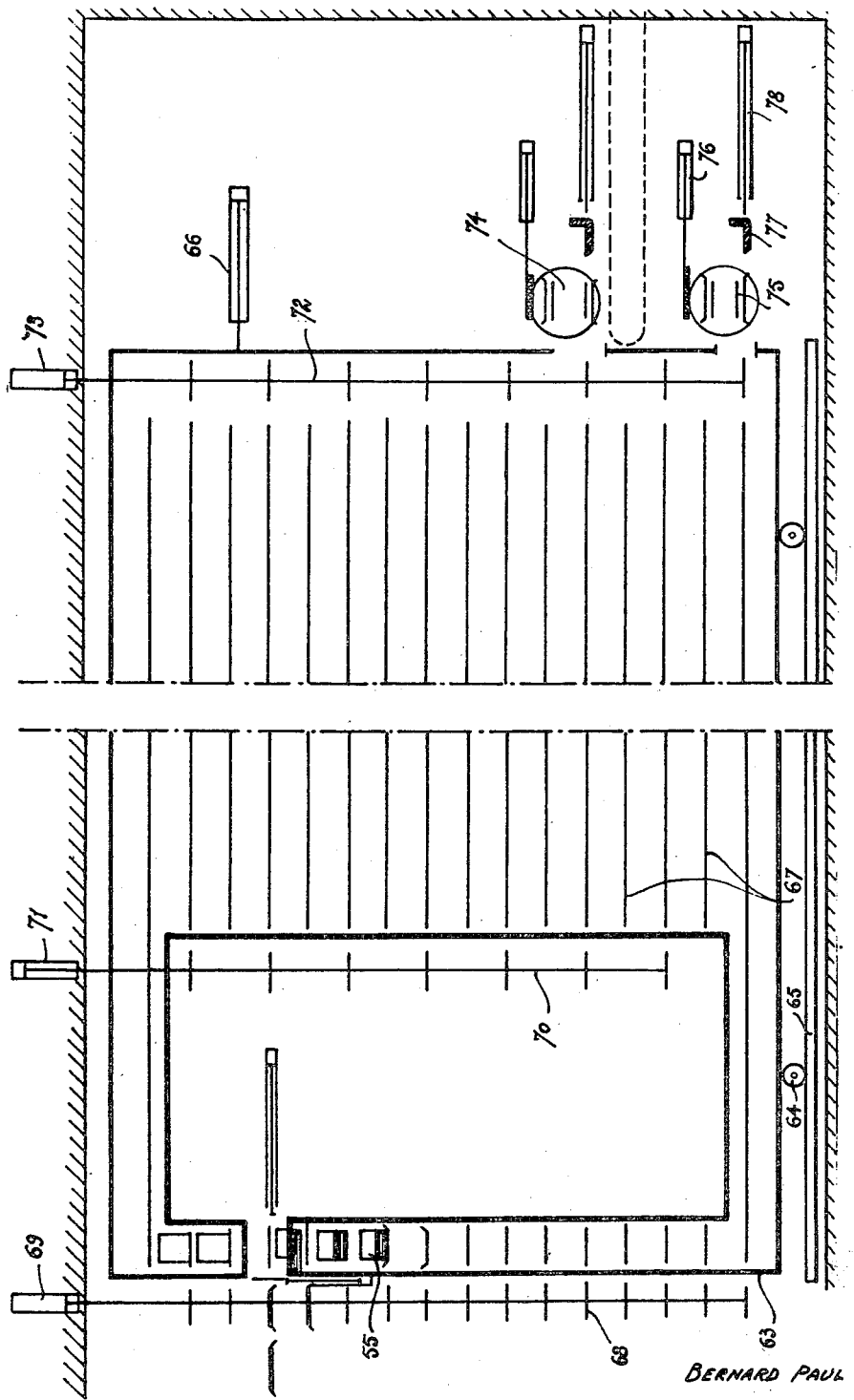
FIG. 7 shows a further construction of the draining station.

Instead of the usual draining shown diagrammatically in FIG. 6, this can be made automatic, as shown in FIG. 7.

In this construction, the moulding chain 18 is associated with a device of similar design to the coagulation station of FIG. 2.

A pusher-frame 63 is mounted on rollers 64 travelling on rails 65, and can therefore receive a longitudinal reciprocating movement of translation by the action of the jack 66. This pusher-frame is associated with an assembly of fixed slides 67 forming supports for the travel of the drainer-moulds.

At 68 is provided a lift device operated by the jack 69. At 70, a further lift device is actuated by the jack 71. A third lift device is provided at 72, driven by the jack 73.

The overturning and de-moulding devices are shown at 74 and 75. Each of these is composed of a rotating drum actuated by a jack 76 and of a feeder fork 77.

When a drainer-mould is pushed on the lift 72, the fork 77 is actuated by the jack 78 and slides under the drainer, carrying the latter away with it and introducing it into the slides of the drum 75 or 74. The jack 76 causes the drum 75 to make half a turn and the fork 77 then brings it back into the lift.

In the same way, the de-moulding of the cheeses can be carried out.

The invention is of course not limited to the arrangements which have just been described above. It may include all alternative forms or equivalent devices. In particular, the methods of travel of the troughs and the drainers may be effected by conveyor devices of any other types, with chains for example.

What I claim is:

1. Apparatus for making cheese in troughs, comprising a coagulation station including a plurality of vertically spaced and superposed substantially horizontal tracks, vertically movable lift means for receiving troughs therefrom and for moving troughs between vertically superposed ends of the tracks, a pusher frame having portions disposed adjacent each end of the tracks, means for reciprocating the pusher frame horizontally so that reciprocation of the pusher frame in one direction pushes troughs from the lift means at one end of the tracks in said one direction onto the tracks and reciprocation of the pusher frame in the other direction pushes troughs from the lift means at the other end of the tracks in said other direction onto the tracks, and curd-breaking means positioned adjacent the path of said troughs for insertion into the troughs to break up the coagulated mass in the troughs.

2. Apparatus as claimed in claim 1, said apparatus including means for inverting the troughs and for draining liquid from the cheese in the troughs.

3. Apparatus as claimed in claim 1, said apparatus including means for introducing into the troughs milk and a coagulating agent.

References Cited by the Examiner

UNITED STATES PATENTS 466,048    12/91    Davis _____ 31—48

FOREIGN PATENTS 1,229,830    9/60    France.

SAMUEL KOREN, Primary Examiner.

CARL W. ROBINSON, Examiner.